Figure 1:
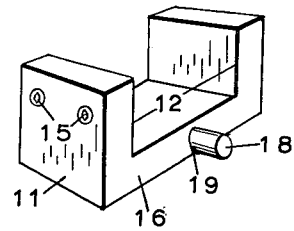

Aug. 10, 1965  W. H. DUXBURY  3,199,881
ATTACHMENT TO LATHE CHUCKS
Filed Aug. 5, 1963

INVENTOR
WILLIAM H. DUXBURY
By Shoemaker and Mattare
ATTYS.

United States Patent Office 3,199,881
Patented Aug. 10, 1965

3,199,881
ATTACHMENT TO LATHE CHUCKS
William H. Duxbury, 42 Tregoning St., Linksfield,
Johannesburg, Transvaal, Republic of South Africa
Filed Aug. 5, 1963, Ser. No. 299,783
Claims priority, application Republic of South Africa,
Aug. 23, 1962, 62/3,570
5 Claims. (Cl. 279—123)

This invention relates to an attachment to be fastened to the jaws of a chuck for a lathe to form a stop in mounting articles for machining.

In a lathe chuck with the normally stepped jaws, to grip a piece of material which must be worked on a surface normal or parallel to its end face, said piece is readily located in the chuck if it can be gripped by one of the steps in the jaws. It is located in the chuck by butting its end face against the adjacent step while effecting the grip. If however the article can only be gripped on a surface shorter than the depth of the step in the jaw it cannot be located on the next step down. Again when the longest step of the jaw is used in an outwardly projecting position it is very useful to have a surface provided against which the material to be machined can be pressed while making the grip.

In these and other cases, where the design of the chuck allows for it, these difficulties have been met by providing special locating studs screwed into the chuck face; in other cases the chuck jaws have been machined and provided with work stops for locating purposes. In many cases however the construction of the chuck does not allow such arrangements to be made, and extensive alterations or additions often limit universability in the future use of the chuck.

In still other cases loose or individual distance pieces, held with wire clips, have been provided to act as stops to locate the article to be worked in proper position in the chuck. Such devices as above referred to either require that the chuck itself, or its jaws, be altered specifically or be built initially to receive the necessary stops. In other cases where the stops have been mounted on wires they are often of such a temporary nature as to make them unreliable in operation. In any case should the work to be turned be nearly as large as the chuck the above described arrangements cannot be used.

It is the object of this invention to provide special attachments for chuck jaws which can be mounted when required and such attachments are so shaped and fastened as to be completely reliable as stops for securing with accurate positioning the piece to be machined.

In accordance with this invention there is provided one or more separable and adjustable units to form stops adapted to be secured to project radially from one or more jaws of a lathe chuck.

Other features of the invention provide for the stop to be slotted to fit onto the normal horizontal face of the chuck jaw, to have adjustable projecting locating plungers and to be clamped in place with headless or Allen screws.

Figure 2:
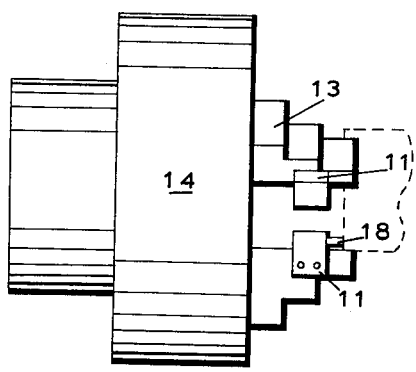
Figure 3:
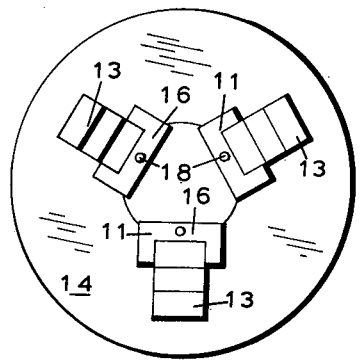
Figure 4:
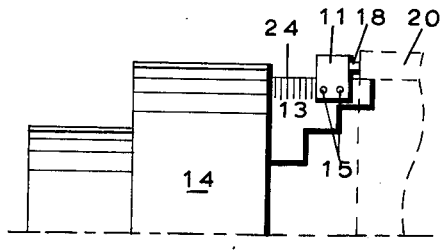
Figure 5:
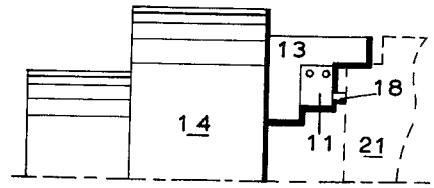
Figure 6:
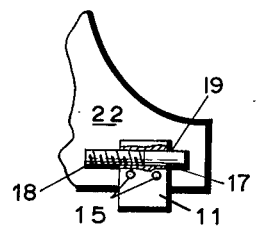
Figure 7:
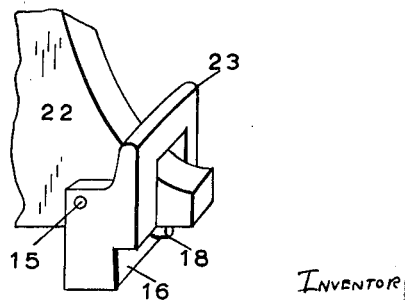

Examples of this invention are illustrated in the accompanying drawings in which:

FIG. 1 shows in perspective a general form of stop according to this invention,

FIG. 2 shows one example of the stop in operable position on a three jaw lathe chuck, FIG. 3 is a front view of FIG. 2, FIG. 4 shows half a lathe chuck and one jaw with the stop in place, FIG. 5 is similar to FIG. 4, but with the stop in a different position, FIG. 6 shows an unstepped jaw for a chuck with the stop in position thereon, FIG. 7 also shows an unstepped jaw with the stop of special shape and in position.

FIG. 1 shows, in perspective, a form of stop 11 which is suitable for general use according to this invention, Stop 11 is conveniently made of steel with a gap 12 to suit the width of the jaw 13 of the lathe chuck 14. 15 are clamping screws preferably headless of Allen form. With the stop 11 clamped fast by screws 15 to the jaws 13 the face 16 of the stop is used to position the work when being clamped in position. However it is often convenient to use the projecting screw 18 for finally positioning the work.

In FIGS. 2 and 3 stops 11 similar in shape to that shown in FIG. 1 are fastened to the jaws 13 of chuck 14. Repetitive machining can be carried out when the parts are individually correctly placed against stops 11 as required.

Once the batch of parts are completed the stops 11 may be removed or adjusted for another batch of work.

The use of the screws 18 is very useful if there are more faces than one for the location of the work piece to be turned. Instead of 18 being in the form of a screw it may be a plunger butting against a screw in the hole 19 and its position regulated by a screw at the back of said plunger. This is shown in FIG. 6 where the screw 18 in the hole 19 abuts against the plunger 17.

It sometimes happens that the lathe is required to work on pieces which must be gripped by the chuck jaws 13 on an internal face. Such a work piece 20 is shown in FIG. 4. In this case no arrangements can be made to locate the work on the face of the chuck 14 which could be effective. In this case the stop 11 is clamped on the jaw 13 on the outside radius and forms a perfect stop for location of the work piece 20.

In FIG. 5 is shown the stop 11 fixed on the inner surface of one step of the jaws 13 which jaws 13 are adapted to grip the work piece 21.

FIGS. 6 and 7 show fragments of lathe chuck jaws 13 which are not stepped. In FIG. 6 the usual stop 11 is used on such a jaw 22, but in FIG. 7 a special form of stop 11, having a locating bridge piece 23, is made use of.

In use when the stops 11 on the jaws 13 are in position a piece of material, which is to be turned with a surface normal to its end face, is readily mounted and clamped in position by holding its end face against the stops 11 projecting inwardly or if desired, outwardly beyond the inner gripping surfaces of the jaws 13.

If the locating face is in one plane the normal face 16 of the stops 11 will act as the required locating surfaces. However under certain circumstances it may be desirable to locate on a special locating face or faces and for this purpose plungers or screws 18 may be made to project from the face 16 of the stop 11, as required.

Each jaw 13 is provided with a similar stop 11 and the face of the jaw 13 along which the stop 11 is adapted to be moved may be marked at intervals as shown at 24, in FIG. 4, to assist in positioning said stop 11 thereon.

As shown it is convenient to avoid projecting heads for the clamping screws 15 or locating screws 18 for the stops 11 and therefore these screws may be headless or recessed such as in the Allen screws shown.

This invention provides a form of stop for a lathe jaw which is adapted to be clamped in any required position and can be used effectively without any alteration to the normal chuck or its jaws.

What I claim as new and desire to secure by Letters Patent is:

1. A stop for mounting on a lathe chuck jaw consisting of a steel block with two side walls and a front face, clamping screws in one wall, and the bottom portion of the block adapted to rest against the horizontal face of the jaw in the lathe chuck abutment means extending from the steel block normal to the front face and means for moving the abutment means in the extended direction with regard to said steel block and for holding the same in its extended position.

2. A stop for mounting on a lathe chuck jaw consisting of a separable and adjustable steel unit having the form of a channel with clamping screws projecting through at least one wall of the channel and in which the forward face of the bottom of the channel has a projecting screw to form an auxiliary and adjustable stop.

3. A stop for mounting on a lathe chuck jaw consisting of a separable and adjustable steel unit, having the form of a channel, with clamping screws projecting through at least one wall of the channel and in which the bottom of the channel is bored parallel to its bottom face and has a screw screwed into said bore from the rear thereof, a plug positioned within said bore from the front thereof, said screw engaging said plug to adjust the position thereof within said bore.

4. A lathe chuck attachment consisting of a steel unit in the form of a channel having integral wall and body portions and with clamping screws projecting through at least one wall portion, the forward face of the body portion of the channel has a projecting screw which forms an auxiliary and adjustable stop.

5. A lathe chuck attachment consisting of a steel unit having an opening through the center thereof from front to back adapted to receive a jaw on which the attachment is to be mounted, and clamping screws projecting through side wall portions of the unit, a bore in the front of said unit substantially parallel to said opening and an auxiliary and adjustable stop positioned in said bore and extending from the front of said unit.

References Cited by the Examiner
UNITED STATES PATENTS

| | | | |
|---|---|---|---|
| 893,875 | 7/08 | Schneider | 269—154 |
| 1,161,490 | 11/15 | McKinney. | |
| 2,045,487 | 6/36 | Oslind. | |
| 2,112,789 | 3/38 | Ross | 269—315 |
| 2,131,880 | 10/38 | Becket | 24—243.7 |
| 2,440,820 | 5/48 | Frank | 269—154 |
| 2,868,552 | 1/59 | Cihak | 279—123 |

FOREIGN PATENTS 271,488   1/51   Switzerland.

ROBERT C. RIORDON, *Primary Examiner.*